United States Patent
Bhave et al.

(10) Patent No.: US 10,758,873 B2
(45) Date of Patent: Sep. 1, 2020

(54) CARBON MOLECULAR SIEVE MEMBRANE FOR GAS SEPARATIONS

(71) Applicant: UT-Battelle, LLC, Oak Ridge, TN (US)

(72) Inventors: Ramesh R. Bhave, Knoxville, TN (US); Nicholas N. Linneen, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 371 days.

(21) Appl. No.: 15/814,515

(22) Filed: Nov. 16, 2017

(65) Prior Publication Data

US 2018/0133659 A1 May 17, 2018

Related U.S. Application Data

(60) Provisional application No. 62/422,815, filed on Nov. 16, 2016.

(51) Int. Cl.
*B01D 53/22* (2006.01)
*B01D 71/02* (2006.01)
(Continued)

(52) U.S. Cl.
CPC ......... *B01D 71/028* (2013.01); *B01D 53/228* (2013.01); *B01D 67/0067* (2013.01); *B01D 69/10* (2013.01); *B01D 69/12* (2013.01); *B01D 69/125* (2013.01); *B01D 71/021* (2013.01); *B01D 71/40* (2013.01); *B01J 29/00* (2013.01); *B01D 69/02* (2013.01); *B01D 71/024* (2013.01); *B01D 2256/10* (2013.01); *B01D 2256/12* (2013.01); *B01D 2256/16* (2013.01); *B01D 2256/18* (2013.01); *B01D 2256/24* (2013.01); *B01D 2256/245* (2013.01);
(Continued)

(58) Field of Classification Search
CPC ................ B01D 69/10; B01D 2256/12; B01D 2257/108; B01D 2256/16; B01D 71/024; B01D 71/40; B01D 2256/10; B01D 2256/18; B01D 67/0067; B01D 2257/11; B01D 2257/104; B01D 71/028; B01D 2325/04; B01D 2257/7022; B01D 69/02; B01D 53/228; B01D 69/125; B01D 2256/24; B01D 2257/504; B01D 71/021; B01D 2257/102; B01D 2256/245; B01D 2257/7025; B01D 69/12; B01J 29/00
See application file for complete search history.

(56) References Cited

U.S. PATENT DOCUMENTS

| 8,945,390 B2 | 2/2015 | Ichikawa et al. |
| 9,731,249 B2 | 8/2017 | Dai et al. |

(Continued)

*Primary Examiner* — Anthony R Shumate
(74) *Attorney, Agent, or Firm* — Warner Norcross + Judd LLP

(57) ABSTRACT

An ultrathin high permselectivity carbon molecular sieve membrane (CMSM) for industrial gas separations is provided. The CMSM includes porous metal or ceramic supports to provide superior stability at high temperatures, pressures and chemical environments. The CMSM also offers the potential for cost-effective gas processing while overcoming disadvantages found in alternative media that are fragile and susceptible to shock due to thermal cycling and prone to end-sealing problems under industrial conditions.

10 Claims, 2 Drawing Sheets

(51) Int. Cl.
  *B01D 71/40* (2006.01)
  *B01D 69/10* (2006.01)
  *B01J 29/00* (2006.01)
  *B01D 69/12* (2006.01)
  *B01D 67/00* (2006.01)
  *B01D 69/02* (2006.01)

(52) U.S. Cl.
  CPC .. *B01D 2257/102* (2013.01); *B01D 2257/104* (2013.01); *B01D 2257/108* (2013.01); *B01D 2257/11* (2013.01); *B01D 2257/504* (2013.01); *B01D 2257/7022* (2013.01); *B01D 2257/7025* (2013.01); *B01D 2325/04* (2013.01)

(56) References Cited

U.S. PATENT DOCUMENTS

| | | | | |
|---|---|---|---|---|
| 2004/0237779 | A1* | 12/2004 | Ma | B01D 53/228 95/55 |
| 2009/0107330 | A1* | 4/2009 | Gu | B01D 53/228 95/55 |
| 2010/0247832 | A1* | 9/2010 | Kim | B32B 38/04 428/41.1 |
| 2013/0081991 | A1* | 4/2013 | Ito | B01D 53/22 210/321.72 |
| 2017/0087508 | A1* | 3/2017 | Kurahashi | B01D 67/0048 |
| 2017/0312695 | A1* | 11/2017 | Majumder | B01D 61/027 |
| 2019/0022597 | A1* | 1/2019 | Hieda | C04B 38/00 |
| 2019/0022599 | A1* | 1/2019 | Takeuchi | B01D 71/56 |

* cited by examiner

CARBON MOLECULAR SIEVE MEMBRANE FOR GAS SEPARATIONS

CROSS-REFERENCE TO RELATED APPLICATIONS

This application claims the benefit of U.S. Provisional Application 62/422,815, filed Nov. 16, 2016, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to semi-permeable carbon membranes for the separation of gases.

BACKGROUND OF THE INVENTION

Membrane-based gas separations are recognized as a solution to global energy needs with advantages in cost and performance. Polymer membranes have been investigated for gas separations for several decades due to low material costs, ease of processing, and available compact geometries. However, the separation performance of polymer membranes has not shown substantial improvements in recent years. Furthermore, polymer materials cannot withstand harsh operating conditions including high temperature and aggressive chemical environments. As an alternative approach, tubular zeolite membranes have been developed for industrial gas separations. As a crystalline structure, tubular zeolite membranes often outperform other separation technologies. However, commercialization efforts have been hampered due to high manufacturing costs, poor reproducibility, and a relatively low surface area/volume ratio.

Carbon molecular sieve membranes (CMSMs) can potentially overcome the limitations of polymer and zeolite membranes for industrial gas separations. CMSMs have shown high thermal and chemical stability and high permselectivity. The high permselectivity is attributed to high porosity and combined connectivity of micropores and ultra micropores below 0.4 nm. Different from zeolite, CMSMs include irregular micropores created by pyrolysis of a polymer precursor where the thermally unstable polymer components are evaporated from a thermally stable backbone polymer. The preparation involves many steps, such as precursor selection and coating, multiple thermal processing, and post-treatment. It is known that the separation performance is strongly dependent on the preparation conditions. However, CMSMs can be tailored to achieve specific separations by optimizing the preparation parameters.

Extensive research has been carried out to understand the correlation between CMSM performance and the preparation parameters. Thermosetting polymers as precursors have been extensively studied, including polyacrylonitrile, polyimide, polyfurfuryl alcohol, phenolic resin, and blending of polymers with different coating techniques, such as spin coating, spray coating, and dip-coating. Pyrolysis conditions, such as gaseous atmosphere, oxidation, and thermal processing conditions are also widely studied. These approaches have resulted in the preparation of selective CMSMs for several challenging gas separations, such as $H_2/CO_2$, $O_2/N_2$, $CO_2/CH_4$, and $C_3H_6/C_3H_8$. Although new understandings and incremental progress has been reported, to date the applications are still limited to laboratory scale.

Further improvements in separation performance and membrane module design are needed for cost-effective industrial scale CMSM systems. Several approaches to the preparation of a high permeance CMSM have been reported by tuning the preparation steps, including polymer processing, atmospheric condition, thermal oxidation, pyrolysis temperature, and post-treatment. While these approaches demonstrate possibilities to realize high permeance, the improvements are still modest. The micropore formation is a natural consequence of structural declinations, and has posed formidable difficulties to simultaneously achieve high permeance and selectivity.

SUMMARY OF THE INVENTION

A method of fabricating an ultrathin high permselectivity carbon molecular sieve membrane (CMSM) for industrial gas separations is provided. The method according to one embodiment includes forming an intermediate layer comprising an inorganic oxide onto a surface of a porous metal or ceramic support structure, forming a polymer precursor film having a thickness of less than 4 μm on a surface of the intermediate layer, and carbonizing the polymer precursor film in an inert atmosphere to form a carbon separating layer having a thickness of less than 1 μm. The CMSM can include a hollow tubular structure in which the carbon separating layer and the intermediate layer are nested within the metal or ceramic support structure. Gas separation according to a gas sieve transport mechanism is achieved by passing a first gaseous mixture over the carbon separating layer and permeating a second gaseous mixture through the CMSM having an enriched constituent gas. CMSMs fabricated and tested according to the foregoing fabrication method were found to achieve high flux gas separations for a range of gases, including hydrogen, helium, carbon dioxide, oxygen, nitrogen, methane, propene, and propane. The CMSM also offers the potential for cost-effective gas processing while overcoming disadvantages found in alternative media that are fragile and susceptible to shock due to thermal cycling under industrial conditions and prone to end-sealing problems under industrial conditions.

These and other features and advantages of the present invention will become apparent from the following description of the invention, when viewed in accordance with the accompanying drawings and the appended claims. Before current embodiments are explained in further detail, it is to be understood that the invention is not limited to the details of operation set forth in the following description or illustrated in the drawings. The invention may be implemented in various other embodiments and of being practiced or being carried out in alternative ways not expressly disclosed herein.

DETAILED DESCRIPTION OF THE CURRENT EMBODIMENTS

The current embodiments provide a method of fabricating a CMSM for gas separations and a related method of use. The CMSM is described in Part I below, the method of fabrication is described in Part II below, and the method of use is described in Part III below.

I. CMSM Structure

Figure 1:
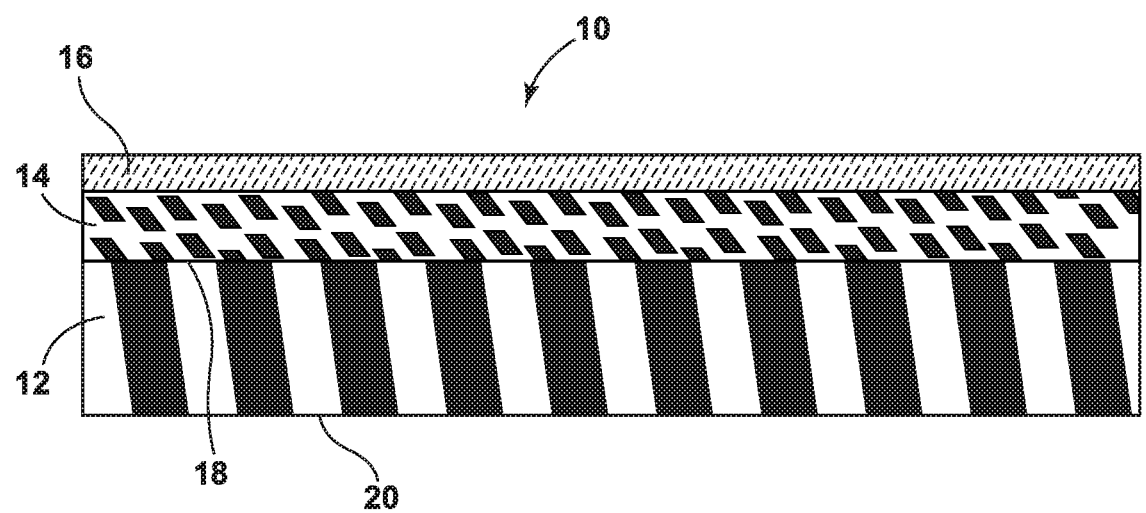
FIG. 1 is a cross-section of a sidewall of a CMSM formed in accordance with an embodiment of the present invention.
Figure 2:
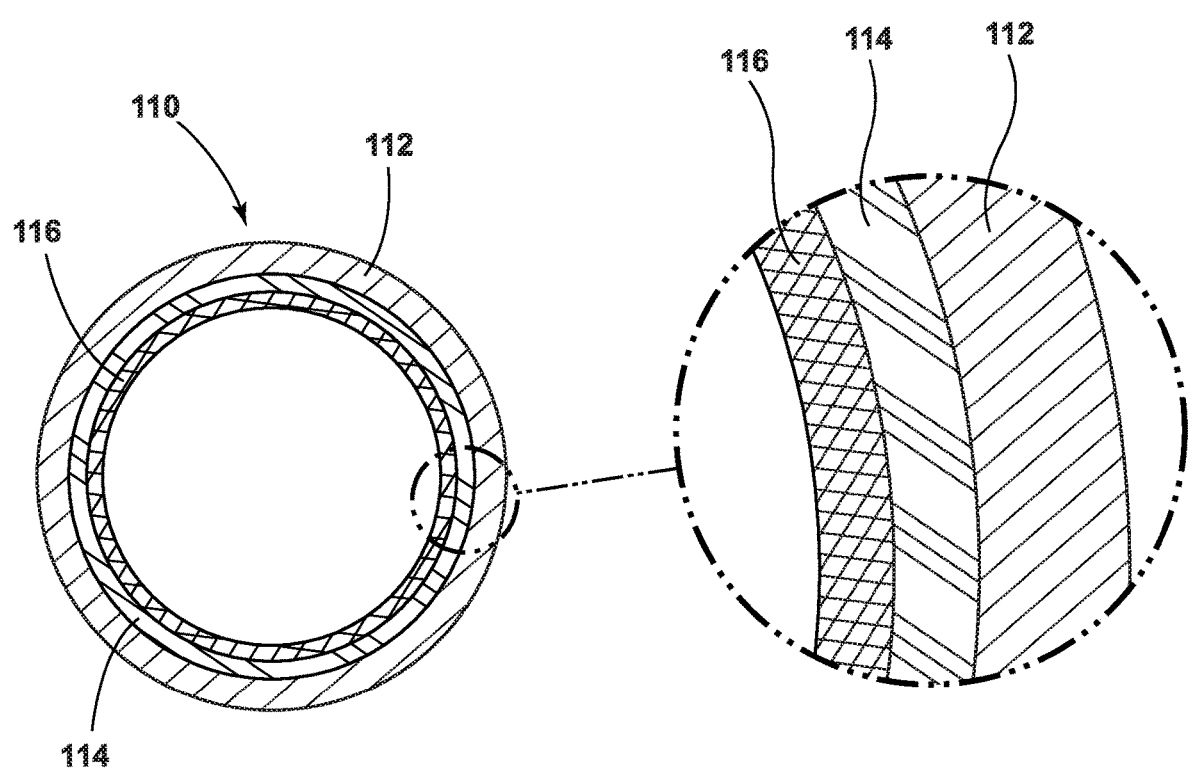
FIG. 2 is a cross-section of a CMSM formed in accordance with another embodiment of the present invention.

Referring now to FIG. 1, a CMSM in accordance with one embodiment is illustrated and generally designated 10. The CMSM 10 is a plate-like membrane in the illustrated embodiment, having a porous metal or ceramic support structure 12, an inorganic oxide intermediate layer 14, and a carbon separating layer 16. The inorganic oxide intermediate layer 14 is interposed between the porous metal or ceramic support structure 12 and the carbon separating layer 16 to prevent the carbon separating layer 16 from penetrating the pores of the metal support structure 12. As alternatively shown in FIG. 2, the CMSM 110 can include a single-channel cylindrical porous metal or ceramic support structure 112 disposed about an intermediate layer 114, which is disposed about a carbon separating layer 116. The cylindrical porous metal or ceramic support structure 112 is integrally bonded to the intermediate layer 114, and the intermediate layer 114 integrally bonded to the carbon separating layer 116. Other configurations for the CMSM are possible in other embodiments.

The porous metal or ceramic support structure 12 generally includes a metal, a metal alloy, a metal oxide, an inorganic oxide, or combinations thereof. Suitable materials include stainless steel, aluminum, nickel, carbon, silicon carbide, alumina, titania, silica and zirconia. The porous metal or ceramic support structure 12 includes a first major surface 18 and a second major surface 20 opposite the first major surface, such that the porous metal or ceramic support structure 12 defines a thickness between the first and second major surfaces 18, 20. The first and second major surfaces 18, 20 of the porous metal or ceramic support structure 12 may be, independently, of any shape, texture, and/or contour, such as smooth, rough, textured, or combinations thereof. The first and second major surfaces 18, 20 of the porous metal or ceramic support structure 12 may be the same or different than one another with respect to any particular characteristic. In some embodiments, the first and/or second major surface 18, 20 of the porous metal or ceramic support structure 12 is substantially smooth. In other embodiments, the first and/or second major surface 12, 20 is textured.

The porous metal or ceramic support structure 12 includes pores that enable fluid communication between the first and second major surfaces 18, 20. The pores can comprise macropores (e.g., pores having an average pore size greater than 50 nm), mesopores (e.g., pores having an average pore size of from 2 to 50 nm), micropores (e.g., pores having an average pore size of less than 2 nm), or combinations thereof. In the current embodiment, the pores of the porous metal or ceramic support structure 12 have a mean pore size of between 0.1 microns and 5 microns, inclusive, further optionally about 4 microns.

In an alternative embodiment, the porous metal or ceramic support structure 12 includes two layers each having different mean pore sizes. For example, the porous metal or ceramic support structure 12 can include a thicker wall macro-porous tubular layer (e.g., 5-10 micron pore diameter) and a thinner quasi-intermediate layer (e.g., 0.1-0.2 micron pore diameter). The inorganic oxide intermediate layer 14 is integrally bonded to the quasi-intermediate layer of the porous metal or ceramic support structure 12, which has a pore size of less than 0.3 nm in this alternative embodiment.

In the current embodiment, the thickness of the porous metal or ceramic support structure 12 is between 0.25 mm to 2.0 mm, inclusive, and the length of the porous metal or ceramic support structure 12 is between 10 cm long to 2.0 m long, inclusive. The thickness between the first and second major surfaces 18, 20 may be uniform or non-uniform. Additionally, the porous metal or ceramic support structure 12 may comprise multiple thicknesses, each independently a distance depending on e.g., a shape or dimension of the porous metal or ceramic support structure or a shape or dimension of an interior cavity if present, as described below.

The porous metal or ceramic support structure 12 is shaped as a hollow cylinder in the present embodiment, thereby defining an interior cavity. The shape of the interior cavity is cylindrical such that the cross-sectional shape of the interior cavity is circular. Furthermore, the interior cavity can be concentric or eccentric with regard to the support structure. The first major surface 18 is further defined as an interior surface and the second major surface 20 is further defined as an exterior surface. In such embodiments, the porous metal or ceramic support structure includes an inner diameter (ID) and an outer diameter (OD). In other embodiments however the porous or ceramic support structure 12 is a monolithic multi-tubular structure, in which a plurality of longitudinal channels extend from a first end thereof to a second end thereof.

The particular composition of the porous metal or ceramic support structure 12 may vary, e.g., depending on the particular inorganic oxide layer selected, the particular polymer precursor film selected, the carbonization conditions employed, the particular gas mixture to be separated, etc., as will be appreciated from the disclosure herein. As such, in addition to or combination with the metal, metal alloy, metal oxide, or inorganic oxide, the porous metal or ceramic support structure 12 may comprise another material. Such other material is generally selected to withstand the conditions used to form and use the carbon molecular sieve membrane, and may include inorganic materials, fibers (e.g., glass fibers, carbon fibers), and combinations thereof. In some embodiments, the porous metal or ceramic support structure comprises an inorganic material. General examples of inorganic materials include metal oxides, ceramics, zeolites, silicon carbide, and the like, and combinations thereof. Examples of suitable inorganic materials include alumina, titania, and zirconia. In addition, the porous metal or ceramic support structure 12 may be linear or branched. For example, in some embodiments the porous metal or ceramic support structure may be bifurcated and thus include one or more portions extending to a third end, a fourth end, a fifth end, etc.

The inorganic oxide intermediate layer 14 is generally selected to provide an improved surface morphology as compared to the first major surface of the porous metal or ceramic support structure 12, such that a uniform thin film or coating may be readily applied thereon. General examples of suitable inorganic oxides include alumina, silica, titania, zirconia and combinations thereof. The inorganic oxide intermediate layer 14 adheres to the first major surface 18 of the porous metal or ceramic support structure 12 and presents a surface opposite the porous metal or ceramic support structure 12. The surface of the inorganic oxide intermediate layer 14 may be of any shape, texture, and/or contour, such as smooth, rough, textured, and the like, or combinations thereof. Generally, as introduced above, the morphology of the surface of the inorganic oxide intermediate layer 14 is selected to allow for uniform thin films or coatings to be applied thereon.

The inorganic oxide intermediate layer 14 defines a thickness that extends between the first major surface 18 of the porous metal or ceramic support structure 12 and the surface of the inorganic oxide intermediate layer 14. In the current embodiment, the thickness of the intermediate layer is between 0.250 microns and 5.0 microns, inclusive. The intermediate layer defines pores that enable fluid communication through the intermediate layer, and thus between the surface of the inorganic oxide intermediate layer 14 and the first major surface 18 of the support structure 12. The pores of the inorganic oxide intermediate layer 14 may be of any size, and thus may be further described as macropores, mesopores, or micropores, as defined above, or combinations thereof. The inorganic oxide intermediate layer 14 defines pores having an average pore size less than the average pore size of the porous metal or ceramic support structure. In some embodiments, the inorganic oxide intermediate layer 14 defines a mean pore size of between 1 nm to 10 nm, inclusive.

The carbon separating layer 16 defines pores that enable fluid communication through the carbon separating layer 16, the intermediate layer 14, and the porous metal or ceramic support structure 12. The pores of the carbon separating layer 16 may be of any size, and thus may be further described as macropores, mesopores, or micropores, as defined above, or combinations thereof. The carbon separating layer 16 defines pores having an average pore size less than the average pore size of the intermediate layer 14. In the current embodiment, the carbon separating layer 16 defines pores having a mean pore size of between 0.1 nm to 5.0 nm, inclusive, further optionally between 0.26 nm and 0.36 nm inclusive, still further optionally about 0.3 nm.

To reiterate, the CMSM 10 includes a porous metal or ceramic support structure 12, an intermediate layer 14, and a carbon separating layer 16. In the current embodiment, the carbon separating layer 12 is a multi-channel cylinder defining a mean pore size of between 0.1 nm and 5.0 nm and a thickness of less than 1 µm. The intermediate layer 14 includes an inorganic oxide and is interposed between the porous metal or ceramic support structure 12 and the carbon separating layer 16. In the current embodiment, the intermediate layer 14 defines a mean pore size of between 1 nm to 10 nm and the inorganic oxide includes alumina, silica, titania, or a combination thereof. The CMSM 10 defines a hollow tubular structure such that the carbon separating layer 16 and the intermediate layer 14 are nested within the porous metal or ceramic support structure 12. In the current embodiment, the CMSM 10 is characterized by a high porosity, high thermal and chemical stability, and high permselectivity. Accordingly, the CMSM 10 is useful for industrial gas separations.

II. Method of Fabrication

Generally, the method of fabricating a CMSM in accordance with the current embodiment includes providing a porous metal or ceramic support structure, forming an inorganic oxide intermediate layer on the porous metal or ceramic support structure, forming a polymer precursor film on the inorganic oxide intermediate layer, and carbonizing the polymer precursor film to form a carbon separating layer. Each step is discussed below.

The porous metal or ceramic support structure is selected to provide mechanical strength to withstand an outward pressure differential applied across the CMSM. The porous metal or ceramic support structure can be formed according to conventional methods and includes any suitably strong porous material, including porous metal, such as stainless steel and nickel, carbon, silicon carbide or a metal oxide such as alumina, titania, silica and zirconia. The mean pore size for the porous metal or ceramic support structure typically differs from the carbon separating layer pore size by an order of magnitude or more. For example, the porous metal or ceramic support structure pore size can be three to four orders of magnitude greater than the pore size of the carbon separating layer.

The method also includes forming an intermediate layer comprising an inorganic oxide on the first major surface of the porous metal or ceramic support structure. The intermediate layer may be formed by any technique, which is typically selected based on the particular inorganic oxide to be formed, the particular porous metal or ceramic support structure being utilized, the particular polymer precursor film selected, the carbonization conditions to be employed, the particular gas mixture to be separated, etc., as will be appreciated from the disclosure herein. In some embodiments, forming the intermediate layer comprises forming a film comprising an inorganic oxide precursor on the first major surface of the porous metal or ceramic support structure, and subsequently processing (e.g., annealing) the film comprising the inorganic oxide precursor to form the intermediate layer. In certain embodiments, forming the film comprising the inorganic oxide precursor includes providing a composition comprising the inorganic oxide precursor and a carrier vehicle. The inorganic oxide precursor is selected based on the inorganic oxide to be formed. General examples of suitable inorganic oxide precursors include aluminum oxides, silicon oxides, titanium oxides, and the like, as well as combinations thereof. Likewise, the carrier vehicle is not limited, and generally comprises a carrier (e.g., solvents, dispersants, etc.) suitable for forming a solution, suspension, emulsion, or the like, when combined with the inorganic oxide precursor. Typically, the particular carrier vehicle is more volatile than the inorganic oxide. General examples of suitable carrier vehicles include water, aqueous solvents, organic solvents, silicone solvents, and the like, as well as combinations thereof. The composition comprising the inorganic oxide precursor and the carrier vehicle is applied to the first major surface of the porous metal or ceramic support structure, e.g., via spin coating, brush coating, drop coating, spray coating, dip coating, roll coating, flow coating, slot coating, gravure coating, and the like, or combinations thereof. The carrier vehicle is then removed (e.g., via spinning, heating, drying, etc.) to form the film comprising the inorganic oxide precursor on the first major surface of the porous metal or ceramic support structure. The film is then processed (annealed, sintered, etc.) to convert the inorganic oxide precursor to an inorganic oxide, thereby forming the intermediate layer comprising the inorganic oxide on the first major surface of the porous metal or ceramic support structure. In certain embodiments, the intermediate layer comprising the inorganic oxide is formed on the first major surface of the porous metal or ceramic support structure via a deposition technique. General examples of deposition techniques include atomic layer deposition (ALD), chemical vapor deposition (CVD), physical vapor deposition (PVD), and the like. In other embodiments, a precursor layer or film comprising the inorganic oxide may be formed on a substrate other than the porous metal or ceramic support structure, and subsequently applied to the first major surface of the porous metal or ceramic support structure to form the intermediate layer.

The method also includes forming a polymer precursor film on the surface of the intermediate layer. The polymer precursor film includes a polymer precursor. The polymer precursor is generally selected based on particularly desired properties of the CMSM being fabricated (e.g., pore size, permeance, selectivity, etc.), the conditions to be employed, and the gases to be separated. As such, a wide range of polymer precursors may be employed without departing from the scope of this disclosure. In general, the polymer precursor is a compound capable of forming a carbon separating layer upon carbonization, described in further detail below. Examples of suitable polymer precursors include acrylonitriles, imides, furfuryl alcohols, phenols, and the like, as well as combinations thereof. In certain embodiments, the polymer precursor comprises, alternatively consists essentially of, alternatively is, a polyacrylonitrile, a polyimide, a poly(furfuryl) alcohol, a phenolic resin, or a combination thereof.

The polymer precursor film may be formed by any suitable technique, such as any of the film-forming techniques described above in relation to forming the intermediate layer. Accordingly, in some embodiments, the polymer precursor film is formed on the surface of the intermediate layer via deposition. In these or other embodiments, forming the polymer precursor film includes applying a polymer composition comprising the polymer precursor and a vehicle (hereafter referred to as the "polymer composition") to the surface of the intermediate layer.

The polymer composition may vary, and is generally formulated to be applied to the surface of the intermediate layer via a coating technique. As such, the vehicle of the polymer composition is not limited, and is generally selected to dissolve, disperse, solubilize, and/or otherwise carry the polymer precursor. General examples of suitable vehicles include organic solvents, silicone solvents, and the like, as well as combinations thereof. In certain embodiments, the vehicle comprises an organic solvent. Examples of suitable organic solvents include: saturated aliphatic hydrocarbons, such as pentanes, hexanes, heptanes, octanes, nonanes, dodecanes, tetradecanes, and hexadecanes; cycloaliphatic hydrocarbons, such as cyclopentane, dipentenes, and cyclohexane; aromatic and halogenated aromatic hydrocarbons, such as benzene, toluene, xylenes, mesitylene, bromobenzenes, and chlorobenzenes; hydrocarbons; alcohols, such as methanol, ethanol, propanols, butanols, heptanols, octanols, butanediols, catechol, terpineol, hydroquinone, isooctyl alcohols, and tetrahydrofurfuryl alcohol; ketones, such as methyl isobutyl ketone and 2,5-hexanedione; ethers, such as butyl ethers, hexyl ethers, phenyl and diphenyl ethers, cyclic ethers (e.g., tetrahydrofuran, dioxane, etc.), and amyl ethers (e.g., diamyl ether); glycols and glycol ethers, such as propylene glycols, triethylene glycols, ethylene glycols, diethylene glycols, propylene glycol methyl ether, dipropylene glycol methyl ether, propylene glycol n-propyl ether, trimethylene glycol, triethylene glycol dimethyl ether, ethylene glycol dibutyl ether, ethylene glycol monophenyl ether, diethylene glycol monomethyl ether, diethylene glycol monoethyl ether, diethylene glycol diethyl ether, diethylene glycol dibutyl ether, propylene glycol monophenyl ether, ethylene glycol monobenzyl ether, and ethylene glycol n-butyl ether; esters, oxylates, and acetates, such as gamma-butyrolactone, diethyl oxalate, dibutyl oxalate, propylene carbonate, butyl esters (e.g., lactic acid butyl ester), diethylene glycol monomethyl ether acetate, diethylene glycol monoethyl ether acetate, dipropylene glycol monomethyl ether acetate, 2-butoxyethanol acetate, and diethylene glycol monobutyl ether acetate; halogenated alkanes, such as trichloroethanes, dichloromethane, and chloroform; siloxanes, such as hexamethyldisiloxanes, octamethyldisiloxanes, and dimethylpolysiloxanes; other solvents, such as white spirits, mineral spirits, naphtha, kerosene, dimethyl sulfoxide, dimethyl formamide, acetonitrile, d-limonene, alpha-terpineol, tetrahydropyran-2-methanol, N-methylpyrrolidone, and sulfolane; derivatives and/or variations of the foregoing; and combinations thereof.

Any amount of the vehicle may be used in the polymer composition, and the vehicle utilized may itself comprise any amount of a particular solvent or combination of solvents. For example, in some embodiments, the vehicle is present in an amount of 20 to 99.9, alternatively from 70 to 99, wt. % based on the total weight of the polymer composition.

Generally, the polymer composition is formulated on a basis of a relative amount of the polymer precursor in the polymer composition, which may vary (e.g., depending on a desired coating technique to be employed). In certain embodiments, the polymer composition is formulated on a basis of a viscosity. For example, in some embodiments, the polymer precursor comprises a viscosity of from 1 to 50, alternatively from 2 to 45, alternatively from 3 to 40, alternatively from 4 to 35, alternatively from 5 to 30, centipoise (cP). In particular embodiments, the polymer composition comprises a viscosity of 5, 10, 15, 20, 25, or 30 cP. The polymer composition is generally formulated to be applied to the surface of the intermediate layer via a coating technique. Any coating technique may be used, such as any of the coating techniques described above. In certain embodiments, the polymer composition is applied to the surface of the intermediate layer via brush coating, drop coating, spray coating, dip coating, or roll coating.

The polymer precursor film is typically formed on the surface of the intermediate layer to a thickness of less than 4 μm. For example, in certain embodiments, the polymer precursor film comprises a thickness of from 0.1 to 1 μm, inclusive. Once the polymer precursor film is formed, the method further includes carbonizing the polymer precursor film to form a carbon separating layer. Carbonizing polymer precursor film includes heating the polymer precursor film to an elevated temperature sufficient to induce pyrolysis of the polymer precursor to form the carbon separating layer. The elevated temperature may vary, e.g. depending on the polymer precursor selected, the thickness of the polymer precursor film formed, the composition of the intermediate layer, etc. Generally, the elevated temperature is from 400° C. and 750° C. Generally, carbonizing the polymer precursor film is carried out in a controlled atmosphere. For example, in some embodiments carbonizing the polymer precursor film is carried out in an inert atmosphere or a vacuum.

In some embodiments, the carbon separating layer 16 may be further defined as a composite carbon separating layer. In these embodiments, the method may include forming a first carbon separating layer on the intermediate layer (e.g., according to the method described above), and subsequently forming a second polymer precursor film on a surface of the first carbon separating layer opposite the intermediate layer, and carbonizing the second polymer precursor film from a second carbon separating layer on the first carbon separating layer, thereby forming the composite carbon separating layer. Similarly, in certain embodiments, the method may further comprise forming a third polymer precursor film on a surface of the second carbon separating layer opposite the first carbon separating layer, and carbonizing the third polymer precursor film from a third carbon separating layer on the second carbon separating layer, thereby forming the composite carbon separating layer. In such embodiments, each of the first, second, and third (if present) carbon separating layers is independently selected, and may be the same as or different than one another, e.g., with respect to thickness, average pore size, chemical composition, etc. Likewise, the first, second, and third (if present) carbon separating layers may be formed using the same or different techniques, including any of the application (e.g., coating, deposition) and carbonization techniques described above. In certain embodiments, the combined thickness of the first, second, and third (if present) carbon separating layers (i.e., of the composite carbon separating layer) is less than 1 μm, such as from 0.01 to 0.5 μm.

III. Method of Gas Separations

A method of performing a gas separation with the CMSM is also provided. The method includes passing a first gaseous mixture over the carbon separating layer 16 of the CMSM 10. Generally, the first gaseous mixture comprises a first gas and a second gas. However, it is to be appreciated that the first gaseous mixture may comprise any number of gases. In some embodiments, the first and second gases are independently selected from hydrogen, helium, carbon dioxide, oxygen, nitrogen, methane, propene, and propane, provided that the first and second gases are different from one another. The method also includes permeating a second gaseous mixture through the CMSM 10. The second gaseous mixture includes an enriched partial pressure of the first gas as comparted to the first gaseous mixture.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of fabricating a carbon molecular sieve membrane for industrial gas separations, the method comprising:
   providing a porous support structure including a first major surface opposite a second major surface and defining a thickness therebetween;
   forming an intermediate layer comprising an inorganic oxide on the first major surface of the porous support structure by applying a composition having an inorganic oxide precursor and a carrier vehicle to the first major surface of the porous support structure, permitting the composition to dry to thereby remove the carrier vehicle, and annealing the dried composition to convert the inorganic oxide precursor into the inorganic oxide intermediate layer;
   forming a polymer precursor film on a surface of the intermediate layer opposite the porous support structure, the polymer precursor film having a thickness of less than 4 μm; and
   carbonizing the polymer precursor film in an inert atmosphere between 400° C. and 750° C. to form a carbon separating layer having a thickness of less than 1 μm, wherein the porous support structure includes a mean pore size that is at least an order of magnitude greater than a mean pore size of the carbon separating layer.

2. The method of claim 1, wherein the porous support structure is a metal support structure or a ceramic support structure.

3. The method of claim 1, wherein forming the polymer precursor film includes applying a precursor composition comprising a polymer precursor and a vehicle to the surface of the intermediate layer.

4. The method of claim 3, wherein the polymer precursor includes (i) a polyacrylonitrile; (ii) a polyimide; (iii) a poly(furfuryl) alcohol; (iv) a phenolic resin; or (v) a combination of (i) to (iv).

5. The method of claim 2, wherein the precursor composition has a viscosity of from 5 to 30 cP.

6. The method of claim 2, wherein applying the precursor composition to the surface of the intermediate layer comprises: (i) spin coating; (ii) brush coating; (iii) drop coating; (iv) spray coating; (v) dip coating; (vi) roll coating; (vii) flow coating; (viii) slot coating; (ix) gravure coating; or (x) a combination of any of (i) to (ix).

7. The method of claim 1, wherein the inorganic oxide comprises: (i) alumina; (ii) silica; (iii) titania; (iv) zirconia; or (v) a combination of (i) to (iv).

8. The method of claim 1, wherein the intermediate layer and the carbon separating layer are each porous, and the carbon separating layer defines an average pore size less than an average pore size defined by the intermediate layer.

9. The method of claim 1, wherein the carbon separating layer is further defined as a first carbon separating layer, and the method further comprises:
   forming a second polymer precursor film on a surface of the first carbon separating layer opposite the intermediate layer, the second polymer precursor film having a thickness of less than 4 μm; and
   carbonizing the second polymer precursor film in an inert atmosphere between 400° C. and 750° C. to form a second carbon separating layer having a thickness of less than 1 μm.

10. The method of claim 8, further comprising:
   forming a third polymer precursor film on a surface of a second carbon separating layer opposite the first carbon separating layer, the third polymer precursor film having a thickness of less than 4 μm; and
   carbonizing the third polymer precursor film in an inert atmosphere between 400° C. and 750° C. to form a third carbon separating layer having a thickness of less than 1 μm.

* * * * *